Jan. 22, 1957  G. D. BAGLEY  2,778,716
ROTARY FURNACE
Filed Oct. 1, 1952  2 Sheets-Sheet 2
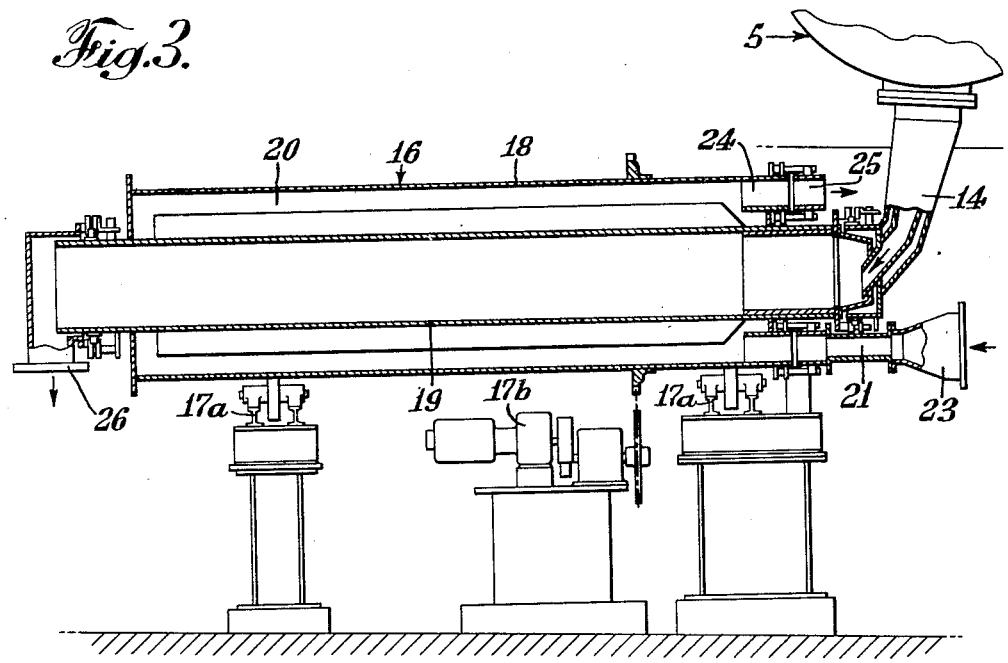
Fig.3.
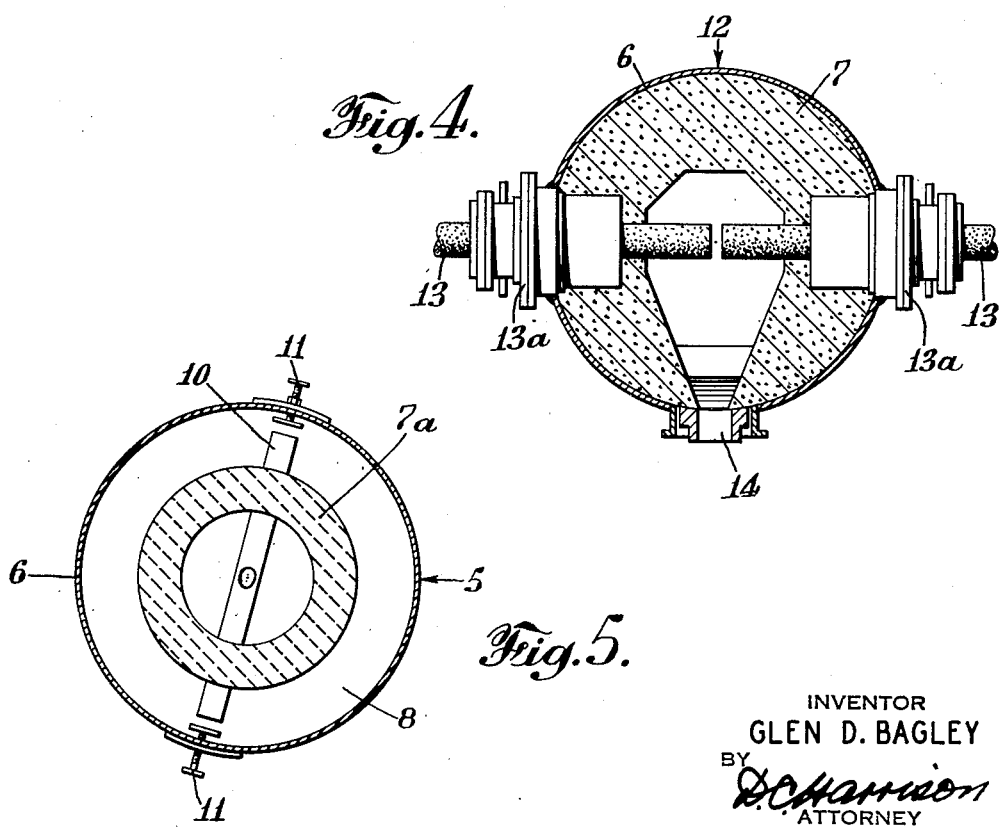
Fig.4.
Fig.5.
INVENTOR
GLEN D. BAGLEY
BY
D.C. Harrison
ATTORNEY

United States Patent Office 2,778,716
Patented Jan. 22, 1957

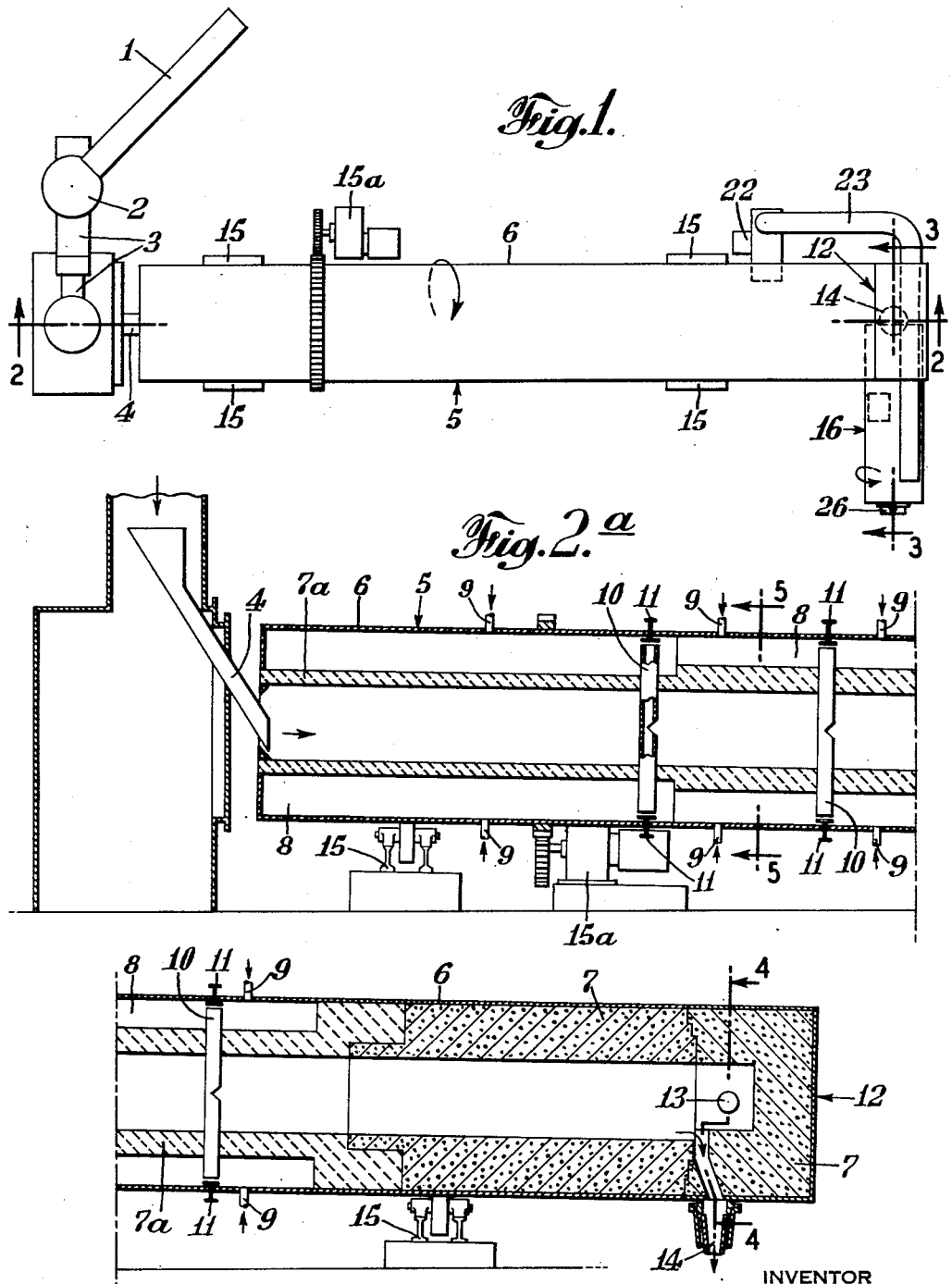

2,778,716

ROTARY FURNACE

Glen D. Bagley, Lewiston, N. Y., assignor to Union Carbide and Carbon Corporation, a corporation of New York Application October 1, 1952, Serial No. 312,629

5 Claims. (Cl. 23—279)

The present invention relates to equipment for the production of calcium carbide and the like and, more particularly, to equipment for the production of calcium carbide from a mixture of powdered reactants without liquefaction of the materials during the reaction.

Heretofore, calcium carbide has been produced by means of the following three-step process: coal is coked, limestone is converted into lime by heating and driving off carbon dioxide, whereupon the coke and lime are then reacted in an electric furnace to produce calcium carbide in the liquid phase.

This three-step procedure is inefficient in that considerable amounts of heat are lost as the products of the intermediate steps are transferred to the electric furnace for the final carbide-producing reaction. In addition, considerable heat of fusion is required to maintain the reactants in the liquid phase during the carbide-producing step.

In my copending application U. S. Serial No. 312,630, filed concurrently herewith, a novel process is disclosed for continuously producing calcium carbide from a pelleted mixture of coal and limestone without liquefaction of the materials. It is the main object of the present invention to provide novel apparatus suitable for the continuous practice of that process thereby eliminating the prior art heat losses and multiplicity of steps occurring at different locations.

Other aims and advantages of the present invention will be apparent from the following description and appended claims.

In the drawings:

Fig. 1 is a plan view showing an assembly of extruder, feeder, rotary furnace and rotary cooler embodying the present invention;

Figs. 2a and 2b are vertical sectional views along the line 2—2 of Fig. 1 and, when taken together, show in detail the rotary furnace and feeder;

Fig. 3 is a vertical sectional view of the rotary cooler taken along the line 3—3 of Fig. 1;

Fig. 4 is a sectional view, along the line 4—4 of Fig. 2b, showing the electrode construction within the rotary furnace; and Fig. 5 is a sectional view, taken along the line 5—5 of Fig. 2a, showing the internal construction of the rotary furnace.

In accordance with the present invention apparatus is provided for continuously pelleting the reactive mix, introducing and reacting the as-formed pelleted mixture in a rotary furnace to produce calcium carbide, and cooling the resulting product before discharging it to the atmosphere. The rotary motion of the furnace together with an elevational drop from the inlet end of the furnace to the exhaust end causes the pelleted mixture to pass through the furnace at a predetermined rate. The rotary furnace has a temperature gradient ranging from about 200° C. at the inlet end to about 1900° C. at the exhaust end. The low temperature portion of the furnace is provided with air inlet pipes which will support the combustion of gaseous products which are formed at the high temperature portion of the furnace and pass to the low temperature portion to burn there. The high temperature portion of the furnace is heated by at least one electric arc between electrodes located in a stator, or stationary head section, which comprises a part of the high temperature portion of the furnace. The interior of the furnace is lined with carbon blocks in the high temperature portion and with standard refractories where the wall temperatures are below 1400° C. When the pelleted mixture has passed through the furnace and is fully reacted it passes by gravity directly into an air-free rotary cooler before being discharged to the atmosphere. Cooling takes place to some extent in a carbon monoxide atmosphere resulting from that produced in the furnace. However, cooling is sufficiently rapid to prevent the occurrence of the reversible reaction and a consequent breakdown of calcium carbide in the product. The rotary cooler, like the rotary furnace, has an elevational drop between its inlet and outlet ends thereby causing the mix to pass through it at a predetermined rate. Heat conducting internal side walls of the cooler serve to transfer heat from the mix to cool air which steadily passes along the opposite side of the internal side walls. After passing through the full length of this cooler the reacted mix is sufficiently cooled to be discharged into the atmosphere without reacting therewith.

More specifically, and with reference to the embodiment shown in the drawings, a long tubular member 1 is provided having internal means for forcing a powdered mixture through itself and a die 2 at its end, thereby forming the powdered mixture into small pellets of a suitable size. Chutes 3 and 4 are provided for delivering this pelleted mix to the inlet end of a rotary furnace 5. The rotary furnace has an outer metal shell 6, and an interior divided into two portions, i. e. a high temperature portion and a low temperature portion. An inner lining suitably of carbon 7 is provided in the high temperature portion and a lining of standard refractories 7a is provided in the low temperature portion. An annular air inlet passage 8 positioned on the inside of furnace 5 at at the low temperature portion of said furnace between outer shell 6 and inner lining 7a, a plurality of air inlet pipes 9 is positioned around outer shell 6 so as to allow air to enter into air inlet passage 8, and a plurality of burner pipes 10 is positioned so as to pass through inner lining 7a and conduct air from air inlet passage 8 to the interior of the low temperature portion of the furnace. Valves 11 are positioned on the outside of the outer shell 6 to regulate the amount of air passing through the burner pipes 10, a stationary furnace head section 12 is positioned at the high temperature portion of the furnace and is provided with at least two electrodes 13, supported in electrode holders 13a, passing through inner lining 7 into the internal portion of the furnace, and a discharge outlet 14 positioned at the base of the stationary head section 12 of the furnace and passing from the interior of the furnace through the inner lining 7 and outer shell 6 to the exterior of the furnace. Furnace support means 15 and control means 15a are provided to support and rotate the furnace. An air-free rotary cooler 16 is provided below the discharge outlet 14 of rotary furnace 5 and coupled thereto. The rotary cooler 16 is supported and rotated similarly to furnace 5 by support means 17a and control means 17b and comprises an outer metal shell 18 and an inner coaxial shell 19 through which the furnace product passes. An annular air passage 20 is provided over the entire length of the cooler between outer shell 18 and inner shell 19. Cooling air inlet passage 21 supplies air from the fan 22 through inlet pipe 23 to annular air passage 20. After cooling the inner shell 19 the then warm air is passed through air exhaust passage 24 to an exhaust stack 25. After the furnace product has passed through the cooler it is discharged to the atmosphere at approximately room temperature through cooler discharge outlet 26.

What is claimed is:

1. An axially-inclined rotary furnace comprising a rotating low temperature section and a stationary high temperature head section axially aligned therewith and connected thereto so as to form a gas-tight seal; said low temperature section having air inlet means directly communicating between the interior and exterior thereof, and means for introducing unreacted mix into said furnace in the low temperature section; said stationary head section having electrode means passing through to the interior thereof and so positioned as to provide at least one arcing zone at the interior of said section; and discharge means positioned in said stationary section for removing the reacted product from said rotary furnace.

2. An axially-inclined rotary furnace comprising a rotating section and a stationary head section axially aligned therewith and connected thereto so as to form a gas-tight seal; said rotating section having an outer shell of metal, an internal lining of carbon covering at least a portion of said rotating section adjacent to said stationary section and an internal lining of refractory covering the remainder of said rotating section, air inlet means directly communicating between the interior and exterior of said low temperature portion of said rotating section, and means for introducing unreacted mix into said furnace in the low temperature portion of said rotating section; said stationary head section having an outer shell of metal, an internal lining of carbon, electrode means passing through said outer shell and internal lining and so positioned as to provide an arcing zone at the interior of said stationary section, and a discharge outlet at the base of said stationary section through said internal lining and outer shell for discharging reacted product from said rotary furnace.

3. An axially-inclined rotary furnace comprising a rotating section and a stationary head section axially aligned therewith and connected thereto so as to form a gas tight seal; said rotating section having an outer shell of metal, an internal lining of carbon covering at least the portion of the interior of said rotating section connected to said stationary section and an internal lining of refractory covering the remainder of said rotating section, a plurality of air pipes communicating between the interior of said rotating section and an air source, means for controlling the supply of air passing through said plurality of air pipes to the interior of said rotating section and means for introducing unreacted mix into said furnace at the low temperature portion; said stationary section having an outer shell of metal, an internal lining of carbon, a plurality of electrodes passing through said outer shell and internal lining and so positioned as to provide at least one arcing zone at the interior of said section, and discharge means for removing the reacted product from said rotary furnace.

4. Apparatus for the continuous production of calcium carbide from a mixture of powdered coal and limestone comprising, in combination, extruding means for pelleting said powdered mixture into relatively small pellets; an axially-inclined rotary furnace having a rotating section and a stationary head section axially aligned therewith and connected thereto so as to form a gas tight seal, said rotating section having an outer shell of metal, an internal lining of carbon covering at least a portion of said rotating section adjacent to said stationary section and an internal lining of refractory covering the remainder of said rotating section, a plurality of air pipes communicating between the interior of the low temperature portion of said rotating section and an air source, means for controlling the supply of air passing through said plurality of air pipes to the interior of said rotating section, and means communicating with said extruding means for carrying said pelleted mixture into said rotary furnace; said stationary section having an outer shell of metal, an internal lining of carbon, a plurality of electrodes passing through said outer shell and internal lining and so positioned as to provide an arcing zone at the interior of said stationary section, and a discharge outlet at the base of said stationary section through said internal lining and outer shell for discharging the reacted products from said rotary furnace; and cooling means communicating with said discharge outlet of said rotary furnace for transferring the heat from said reacted products in an air-free atmosphere prior to discharging said reacted products to the atmosphere.

5. Apparatus for the continuous production of calcium carbide from a mixture of powdered coal and limestone comprising, in combination, extruding means for pelleting said powdered mixture into relatively small pellets; an axially-inclined rotary furnace having a rotating section and a stationary head section axially aligned therewith and connected thereto so as to form a gas tight seal; said rotating section having an outer shell of metal, an internal lining of carbon covering at least a portion of said rotating section adjacent to said stationary section and the remainder of refractory, an annular air space located between said outer shell and said internal lining of refractory and extending over at least a substantial portion of the length of said rotating section, a plurality of air pipes communicating between said annular air space and the interior of said low temperature portion of the rotating section, means communicating between the exterior of said outer shell and said annular air space, means for controlling the supply of air passing through said plurality of air pipes to the interior of said rotating section, and means communicating with said extruding means for carrying said pelleted mixture into said rotary furnace; said stationary section having an outer shell of metal, an internal lining of carbon, a plurality of electrodes passing through said outer shell and internal lining and so positioned as to provide an arcing zone at the interior of said stationary section, and a discharge outlet at the base of said stationary section through said internal lining and outer shell for discharging the reacted products from said rotary furnace; and cooling means communicating with said discharge outlet of said rotary furnace for transferring the heat from said reacted products in an air-free atmosphere prior to discharging said reacted products to the atmosphere.

References Cited in the file of this patent
UNITED STATES PATENTS

| | | |
|---|---|---|
| 875,331 | Dull et al. | Dec. 31, 1907 |
| 900,192 | McKnight | Oct. 6, 1908 |
| 904,991 | Price | Nov. 24, 1908 |
| 966,542 | Hartenstein | Aug. 9, 1910 |
| 1,035,727 | Peacock | Aug. 13, 1912 |
| 1,220,111 | Helfenstein | Mar. 20, 1917 |
| 1,435,930 | Laury | Nov. 21, 1922 |
| 1,791,403 | Debuch | Feb. 3, 1931 |
| 1,929,069 | Kalling et al. | Oct. 3, 1933 |
| 2,351,677 | Gygi | June 20, 1944 |